(12) United States Patent
Iacobucci

(10) Patent No.: US 7,089,852 B2
(45) Date of Patent: Aug. 15, 2006

(54) WASTE COMPACTOR

(75) Inventor: Emilio Iacobucci, Frosinone (IT)

(73) Assignee: Iacobucci S.p.A., Ferentino (IT)

( * ) Notice: Subject to any disclaimer, the term of this patent is extended or adjusted under 35 U.S.C. 154(b) by 0 days.

(21) Appl. No.: 10/776,679

(22) Filed: Feb. 11, 2004

(65) Prior Publication Data

US 2004/0200367 A1  Oct. 14, 2004

(30) Foreign Application Priority Data

Feb. 12, 2003  (IT)  ................ RM20030033 U

(51) Int. Cl.
*B30B 1/18*  (2006.01)

(52) U.S. Cl. ............... 100/100; 100/225; 100/226; 100/229 A; 100/289; 100/215

(58) Field of Classification Search ........... 100/48, 100/100, 215, 225, 226, 233, 229 R, 229 A, 100/289, 290, 287; 220/531
See application file for complete search history.

(56) References Cited

U.S. PATENT DOCUMENTS

| 3,352,230 | A | * | 11/1967 | Hunnicutt | ............... 100/345 |
|---|---|---|---|---|---|
| 3,589,277 | A | * | 6/1971 | Gray et al. | ............... 100/95 |
| 3,727,546 | A | * | 4/1973 | McKinney | ............. 100/229 A |
| 3,929,064 | A | * | 12/1975 | MacFarlane | ............... 100/345 |
| 4,073,228 | A | * | 2/1978 | Henzl | ............... 100/52 |
| 4,130,054 | A | * | 12/1978 | Tashman | ............... 100/52 |
| 4,188,877 | A | * | 2/1980 | Khan | ............... 100/290 |
| 4,620,479 | A | * | 11/1986 | Diamond et al. | ........... 100/215 |
| 4,700,623 | A | * | 10/1987 | Durbin et al. | ............... 100/52 |
| 4,719,852 | A | * | 1/1988 | Durbin et al. | .......... 100/229 A |
| 4,870,898 | A | * | 10/1989 | Spencer | ............... 100/345 |
| 5,024,151 | A | * | 6/1991 | Girardin et al. | ............ 100/349 |
| 5,263,412 | A |   | 11/1993 | Chenard et al. | .......... 100/229 A |
| 5,623,412 | A |   | 4/1997 | Masson et al. | .......... 364/431.03 |

\* cited by examiner

*Primary Examiner*—Derris H. Banks
*Assistant Examiner*—Jimmy Nguyen
(74) *Attorney, Agent, or Firm*—Ohlandt, Greeley, Ruggiero & Perle, L.L.P.

(57) ABSTRACT

A trolley suitable for aircraft or use in all space constraint situations comprising a waste compactor comprising a metal horizontal plate driven by an electric motor reducer that, by a mechanical reducer, drives two telescopic screws responsible for pushing the horizontal plate onto the waste, compacting it.

11 Claims, 4 Drawing Sheets

WASTE COMPACTOR

TECHNICAL FIELD

This invention relates to a waste compactor. More specifically, it relates to a waste compactor for compacting trash produced on civil aviation aircrafts during flights and a trolley for housing said waste compactor.

The waste compactor can handle items such as plastic or paper plates and cups, plastic cutlery, aluminium drink cans, aluminium food containers, Tetrapak-type cartons, paper napkins, etc.

BACKGROUND ART

Waste compactors, like all the other accessory equipment used onboard aircrafts, must comply with specific, strict requirements provided for by aeronautical regulations. Specifically, the dimensions and structural characteristics of all civil aircraft accessories must be able to support the loads specified in the applicable regulations in force; furthermore, the accessories must be suitable for being housed and stored in safety during travel in specific aeroplane compartments. Finally, the accessories must be as light as possible.

Reducing the in-flight weight by about one kilogram leads to significant savings in energy and running costs over the useful life of the aircraft.

The operating principle of the compactors available on the market today is not particularly suited for aviation applications. The compactors suffer from several problems, notably: the large dimensions of the waste compactor, the high electrical power required, the use of significant amounts of a pressurized oil fluid, and the use of structurally complex and costly operating and control systems in terms of construction and maintenance.

To resolve the above drawbacks, research efforts have focused on doing away with the hydraulic system for safety and cleanliness reasons: components that work under pressure are a potential source of hazards, especially in an aeroplane. One proposed solution was to switch to an electromechanical system. Document U.S. Pat. No. 5,263,412 describes a compactor comprising a horizontal plate driven by an electric motor, which generates a rotary motion, and mechanisms—specifically, a pantograph system—to convert rotary motion into translational motion for moving the horizontal plate.

Unfortunately, although this system resolves the problems related to the hydraulic system, it has a serious drawback: it requires the application of very high forces to execute a complete compaction cycle due to the high multiplication ratio of the pantograph. Consequently, this system requires the use a very powerful motor adding bulk, weight, and generating high mechanical stress on the upper structure of the trolley.

SUMMARY OF THE INVENTION

It is an object of this invention to provide a waste compactor that resolves the aforementioned problems.

It is a main object of this invention to provide a waste compactor that is operated by an electromechanical system, has compact dimensions, and requires a reasonably low electrical input.

It is another object of this invention to provide a cart, the so-called "trolley", that comprises said waste compactor and meets the specific requirements for use in environments with space and weight constraints and, in particular, for aviation applications.

The trolley in accordance with the present disclosure has the additional advantage of facilitating handling, movement, and removal of the waste containers deformed by the compacted waste after compaction.

BRIEF DESCRIPTION OF THE DRAWINGS

These and other advantages and features of the invention shall be readily apparent from the more detailed description of preferred embodiments of a waste compactor, given by way of non-limiting examples and in conjunction with the following accompanying figures.

DESCRIPTION OF THE INVENTION

Figure 1:
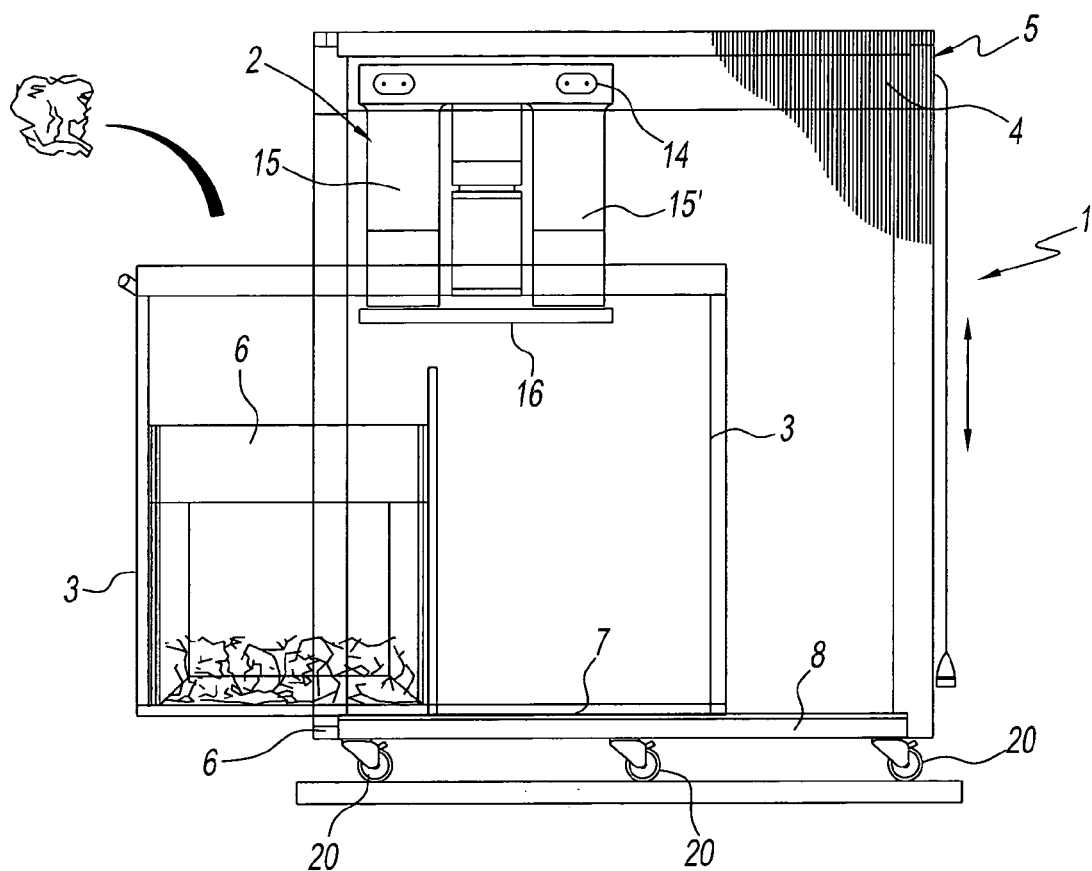
FIG. 1 shows a longitudinal, vertical, sectional view of a trolley comprising a waste compactor in accordance with the invention.
Figure 2:
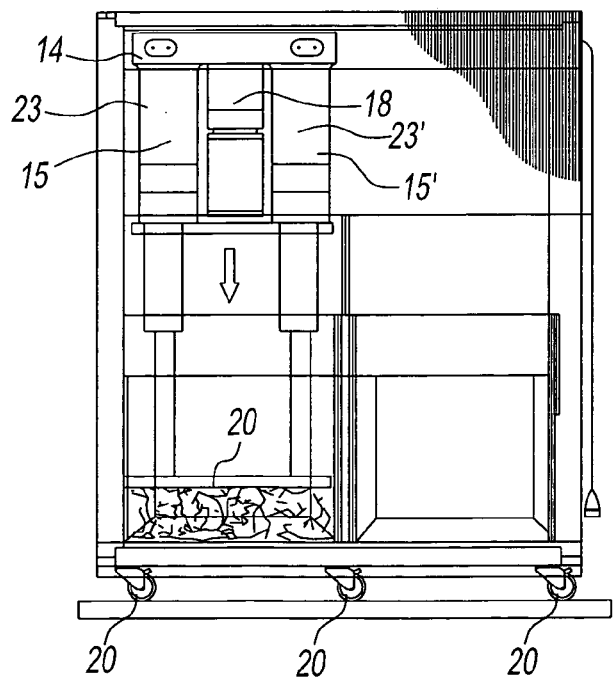
FIG. 2 shows a longitudinal, vertical, sectional view of a trolley comprising a waste compactor in accordance with the invention during compaction.
Figure 5:
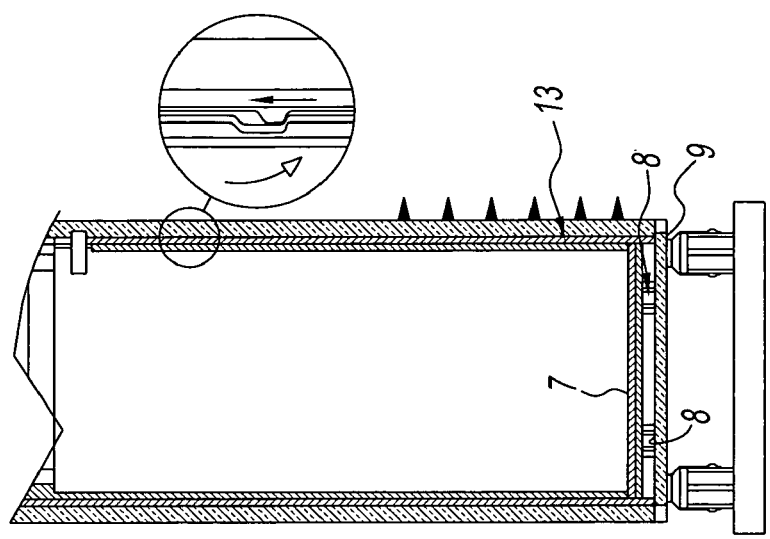
FIG. 5 shows a detail view of a vertical section of a trolley comprising a waste compactor in accordance with the invention.
Figure 4:
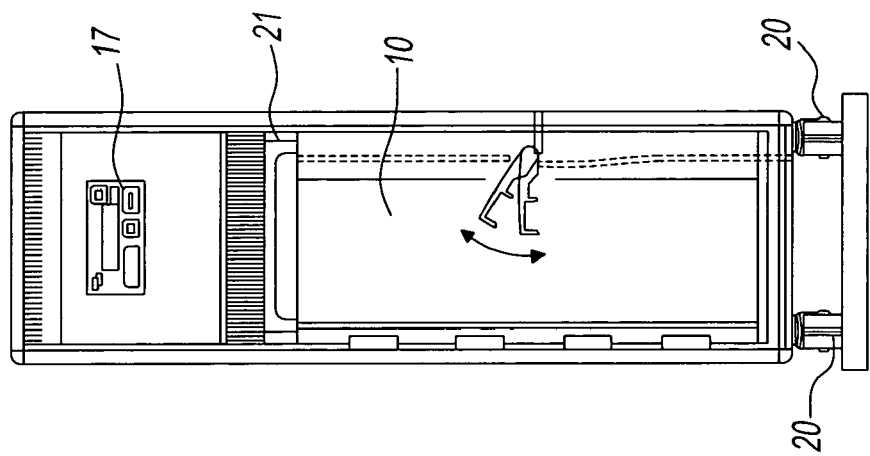
FIG. 4 shows a front view of a trolley comprising a waste compactor in accordance with the invention.
Figure 3:
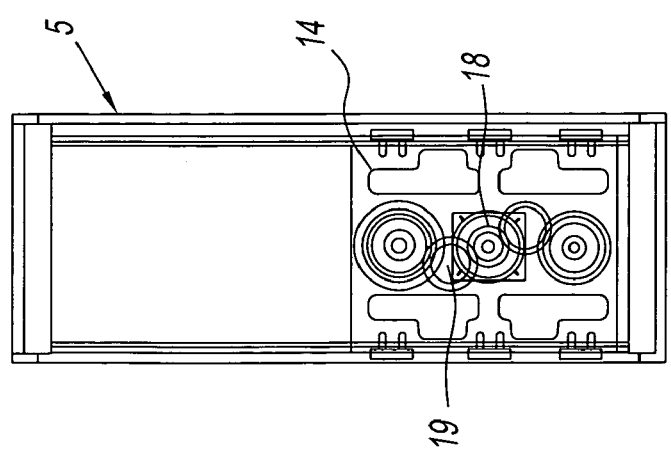
FIG. 3 shows a plan view of the top of a trolley comprising a waste compactor in accordance with the invention.
Figure 6:
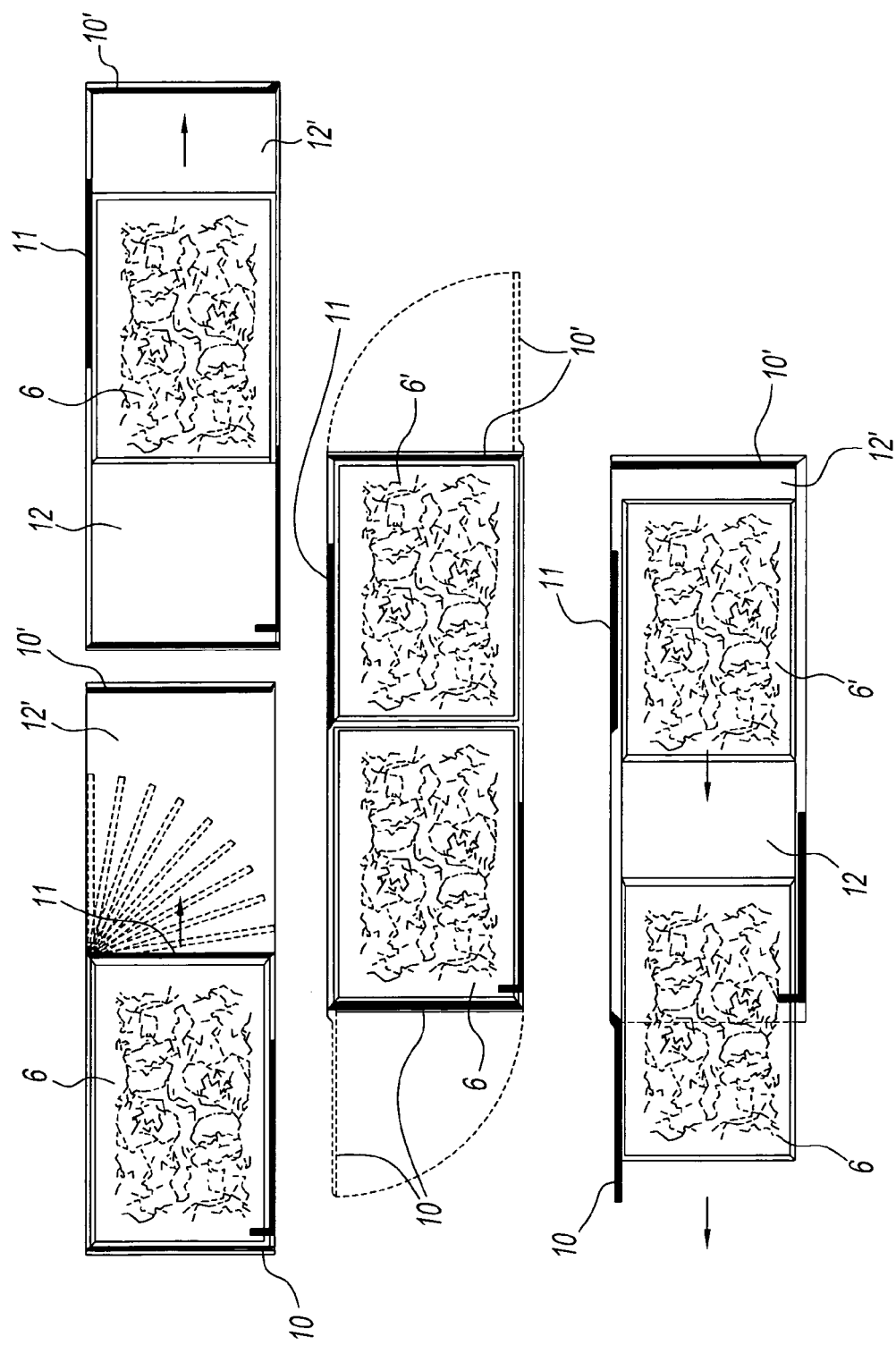
FIG. 6 shows a plan view of the moving part of a trolley comprising a waste compactor in accordance with the invention, during different operating stages.

The figures show the preferred embodiments of a trolley 1 comprising a waste compactor 2 attached to a structure consisting of a moving part or drawer 3 moving from the inside to the outside of the trolley 1, a fixed part 4, and an outer casing 5. The dimensions of the trolley are typical of an aeronautical "full size trolley" or, depending on the case, "half size trolley". In an alternative embodiment of the trolley, the fixed part 4 and the outer casing 5 comprises a single structure carrying out both functions.

The waste compactor 2 comprises an electric motor 18, preferably a motor reducer, that generates rotary motion and is connected to mechanisms comprising a reducing unit 19 and two telescopic screws 15, 15'. The telescopic screws drive the horizontal, metal, compaction plate 16 by means of vertical, translational motion. For improved mechanical stability, the system should preferably consist of two paired screws 23, 23' driven by a single electric motor. Preferably, a twin system of telescopic, ball bearing screws 23, 23' should be used to optimize performance close to 100%.

The moving part or drawer 3 houses two waste containers or boxes 6, 6'. A recess is machined from the base or the bottom 7 of the drawer 3 and is covered with a grate designed to collect any fluids flowing from the waste containers. The front and back of the trolley are equipped with a door 10 and 10', respectively provided with a spring latch and safety catch for locking. The moving part 3 slides on prismatic guides 8, 8' secured to the base or bottom 9 of the fixed part 4. The drawer contains two compartments or chambers 12, 12' separated by a central openable partition 11 dividing the front chamber 12, wherein compaction takes place, so-called "compaction chamber", from the rear chamber 12', wherein the box of compacted waste is pushed from the front chamber when full, so-called "storage chamber".

An advantageous alternative embodiment of the trolley 1 in accordance with the invention features means designed to facilitate the handling, movement, and removal of the waste containers 6, 6'. A moving side wall 13 of the drawer 3 is hinged to the top of the drawer structure by a horizontal hinge 25 so that said side wall moves outward toward the drawer 3 and the fixed part 4 when the bottom part of said moving side wall 13 is rotated.

The moving side wall 13 is preferably limited only to the compaction chamber to obtain more space inside the compaction chamber 12. On the vertical walls of the rear chamber 12', two side guides placed horizontally compensate for the thickness of the moving wall 13. This compaction is ideal for preventing the boxes full of waste, which tend to deform during compaction, from getting stuck when pushed in either direction.

Normally, persons wishing to dispose of waste throw the waste into the front box 6 of the drawer 3. To do so, all persons must turn the handle fitted onto the outside of the front door 10, pull out the drawer, throw the waste into the container, and, finally, push the drawer 3 back into the trolley 1.

The invention includes a specific electromechanical system for retaining the drawer not shown in the Figures to prevent the drawer from opening unexpectedly during the compaction cycle.

Thus, to release the drawer, the specific button must be pressed first.

Only after said button is pressed will the control system, after making sure that the status of the waste compactor is okay, release the drawer.

An appropriate spring latch system is provided to lock the closed drawer.

The central partition 11 is opened with a lever 21 placed in the top part of the drawer; the lever can only be pulled when the front door 10 is open.

Once the lever is released and the box is pushed, the central openable partition 11 opens and is stowed away at the side of the rear chamber 12'. A return spring not shown in the Figures allows this door to close automatically when there is no box to prevent movement.

In an advantageous embodiment of the trolley in accordance with the invention, the same type of device used to open the central openable partition 11 is used to operate the moving side wall 13, which is hinged to the top of the drawer structure, of the compaction chamber of the drawer.

The moving side wall 13 solution is conveniently designed to change the internal transversal dimensions of the compaction chamber, effectively facilitating sliding in both directions. This resolves the problem that occurs when the box full of compacted waste bulges enough to hinder movement.

When the device is operated by pulling the lever, the entire moving wall 13 rotates around the axis of the hinge and the bottom part moves outward when facing the rear of the trolley, counterclockwise rotation if the moving wall is on the right of the trolley or clockwise rotation if the moving wall is on the left.

Once the boxes 6, 6' have been removed, when the lever is pushed both the central openable partition 11 and the moving side wall 13 are locked again; in this way the partition and wall return to their vertical position in their initial configuration.

The fixed part 4 comprises two bearing side walls joined together at the bottom by means of a plate, which forms the base or the bottom 9 to which the prismatic guides 8, 8' are attached.

The top part of the fixed part 4 houses the box 14 containing the reduction gears 19 and an electric motor reducer 18 for driving the telescopic screws 15, 15'. The telescopic screws 15, 15' are connected to the horizontal compaction plate 16, which is pushed in the vertical direction.

Essentially, the rotary motion generated by the motor reducer 18 is transferred to the reduction gears 19 and converted to extend the telescopic screws 15, 15', causing the metal plate 16 to move down or up through vertical translation motion. The movement of the compaction plate 16 compacts the waste found in the container 6 housed in the chamber 12 above the grate placed on the base or bottom 7 of the drawer 3. In turn, the drawer rests on the bottom 9 of the fixed part 4 on which the guides 8, 8'—on which the drawer slides—are fitted.

Both the telescopic screws 15, 15' and the gear box 14 are anchored to the fixed part 4. The gear box houses the reduction gears 19 to which the electric motor 30 reducer 18 and the components of the electronic control, not shown in detail in the Figures, are connected.

The gear box 14 is a weight-bearing structure through which the compaction load, generated by the action of the telescopic screws 15, 15', is absorbed by the fixed part 4 through the following load path: the two side walls, the horizontal plate 9 that acts as base for the fixed part 4. Only these items are subjected to the mechanical stress generated by the compaction cycle; the other parts of the drawer and casing are not affected. The total weight of the trolley 1 is also reduced thanks to this innovative type of construction.

As was already mentioned, all persons wishing to dispose of waste, normally the flight attendants, throw the waste from above top-loading system into the front area of the trolley. Before doing so, the handle on the trolley must be turned to release the locking system of the front door 9 and allow the drawer 2 to be pulled outward by a predetermined amount. Once the waste is thrown away, the drawer must be secured by turning said handle once again, reactivating the internal locking system of the drawer.

For the proper and effective operation of the system, the front of the fixed part 4 is fitted with a control panel 17 that interfaces with an electronic unit managed by a microprocessor with software. In this way, it is possible to manage the different operating phases of the compactor 2 appropriately coordinating the functions of compaction, opening the drawer 3 for changing the boxes 6, 6', cleaning the interior, and so forth. Furthermore, the control display is a useful tool for viewing information such as the number of cycles and the hours of operation and/or other useful information for the maintenance of the trolley 1 and the compactor 2.

The inside of the trolley 1 is fitted with different types of sensors—which can be microswitches, optical, magnetic, etc.—that are used to enable/disable compaction and assure safety at all times. Specifically, at least one optical sensor checks for the presence of the box in the compaction area; a microswitch makes sure that the front 10 and rear 10' doors of the trolley, and possibly also the central openable partition 11, are closed; and other sensors may be present to control any other function deemed necessary.

A red emergency button is fitted for added safety, advantageously, on the control panel at the front of the trolley 1.

When the second box 6' is also full, the compaction unit must be emptied before reuse. To make box changing/removal and trolley 1 cleaning operations easier, the trolley can be easily removed from the galley or from other area of the aircraft vehicle where it is stowed.

To remove the boxes 6, 6' from the chambers 12, 12', the front door 10 must be opened and the central openable partition 11 must be released; a rear door 10' is also included for easier maintenance and cleaning of the compactor.

To clean the inside of the trolley, the front control panel features a button for placing the compaction plate at a height suitable for cleaning, using a cloth, the top from any remains produced during compaction. This operation is made easier thanks to the presence on the top of the compaction plate 16 of only slender or small elements such as the telescopic screws 15, 15' and any protective devices. Cleaning the top part of the walls of the fixed part is also facilitated by the use of the telescopic screws 15, 15' in accordance with the invention: these become shorter in length compared with other known systems.

As previously mentioned, there is a recess covered by the removable grate in the base plate 8 of the drawer or in the moving part 3. This recess collects any fluids flowing from the boxes and can then be emptied by the personnel.

The outer casing 5 consists of a frame to which the fixed part is attached by means of appropriately placed screws or other fastening means. The casing is made of extruded sections, forming the framework, that are joined with aluminium angle bars; sandwich panels are used for the side walls and the top. The side plates completely cover at least the compaction area and are joined to the framework of the outer casing 5.

Six wheels 20 for moving the trolley are fastened to the bottom part of the base of the casing 5.

Figure 7:
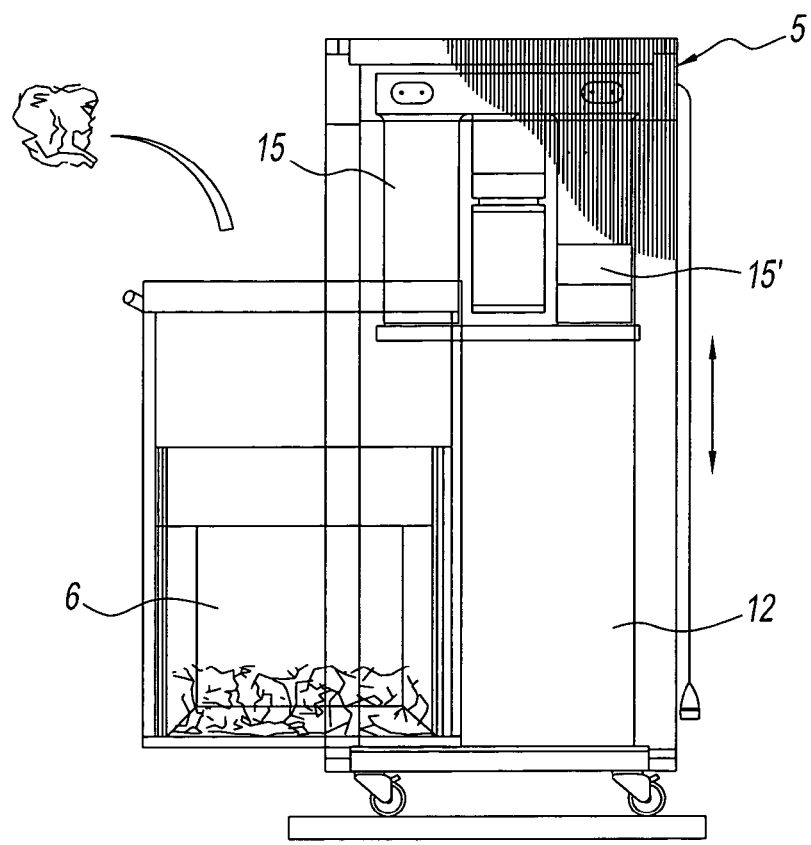
FIG. 7 shows a longitudinal, vertical, sectional view of a small trolley, the so-called "half size trolley", comprising a waste compactor in accordance with the invention.
Figure 8:
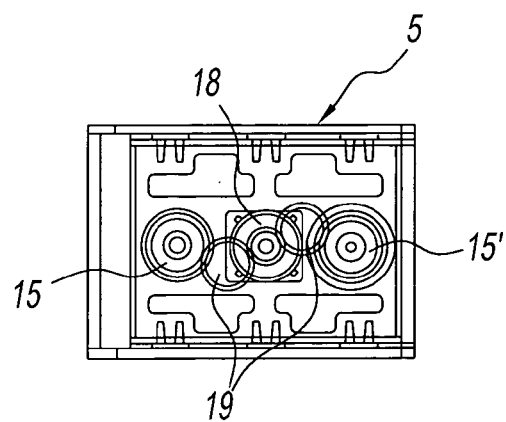
FIG. 8 shows a plan view of the top of a half size trolley comprising a waste compactor in accordance with the invention.

Another advantageous embodiment of the invention, see FIGS. 7 and 8, where the components are identified with the same reference numbers as the ones used for the already described embodiments, is the smaller trolley 1, the so-called "half size trolley". This comprises the waste compactor 2 joined to a structure consisting of a moving part 3—equal to approximately half the length of the previously described embodiment of the trolley—that can contain only one box 6 where the compaction takes place, in addition to a fixed part 4 and a casing 5.

The moving part or drawer 3 is the item of the structure that houses the single waste container 6 and is equipped with a single door 10 at the front. This door has a spring latch and safety catch for locking. The central openable partition is not included in this embodiment of the invention.

The use of the trolley in accordance with the invention is not limited to the aviation industry; the trolley can also be used on coaches, trains, and ships or in the civil sector in general whenever it is necessary to compact this type of waste and there are space constraints.

The trolley is made of materials particularly suited for use on aircraft for example, Aluminium alloys; however, other materials can be used if the trolley is employed on vehicles where there are not the same structural and weight constraints.

The particular embodiments described in this document do not limit the scope of this patent application, which covers all the embodiments of the invention defined in the claims.

What is claimed is:

1. A trolley comprising:
   a waste compactor comprising a metal horizontal plate driven by an electric motor, which generates rotary motion, and mechanisms, which convert said rotary motion into translational motion, for moving the metal horizontal plate, wherein said mechanisms comprise at least two telescopic screws and define a weight-bearing structure through which a compaction load, generated by said translational motion is absorbed;
   a drawer designed to house waste containers, a fixed part to which the waste compactor is attached, and an outer casing, wherein the fixed part and the drawer are housed in the outer casing.

2. The trolley as claimed in claim 1, further comprising an electronic means for controlling operating phases of the waste compactor and of the drawer.

3. The trolley as claimed in claim 2, wherein the drawer further comprises two doors.

4. The trolley as claimed in claim 3, further comprising a means for facilitating the movement and removal of the waste containers deformed by the compaction.

5. The trolley as claimed in claim 4, wherein said means for facilitating the movement and removal of the waste containers comprises a side wall that rotates around a horizontal hinge.

6. The trolley as claimed in claim 1, further comprising a chamber for housing two waste containers.

7. The trolley as claimed in claim 1, wherein the drawer further comprises a central openable partition.

8. A trolley comprising:
   a waste compactor provided with a compaction plate and an electric motor generating a rotary motion;
   two telescopic ball bearing screws; and
   a gear box transmitting said rotary motion to said two telescopic ball bearing screws so that said two telescopic ball bearing screws convert said rotary motion into a translational motion of said compaction plate, wherein said gear box comprises a weight-bearing structure through which a compaction load generated by said translational motion of said compaction plate is absorbed; two waste containers; and
   a drawer, a fixed part, and an outer casing, said outer casing housing said fixed part and said drawer, said drawer supporting said two waste containers for movement with respect to said waste compactor, wherein said waste compactor is attached to said fixed part.

9. The trolley as claimed in claim 8, wherein said fixed part and said outer casing form a single unit.

10. The trolley as claimed in claim 8, further comprising an electronic control for controlling the operating phases of said waste compactor and said drawer.

11. The trolley as claimed in claim 8, further comprising a side wall hinged so that said side wall can move outward to facilitate removal of said two waste containers after deformation by said translational motion of said compaction plate.

* * * * *